Patented Mar. 9, 1926.

1,575,865

UNITED STATES PATENT OFFICE.

PAUL MELVIN PAULSON, OF PERTH AMBOY, NEW JERSEY, ASSIGNOR TO THE ROESSLER AND HASSLACHER CHEMICAL COMPANY, OF NEW YORK, N. Y., A CORPORATION OF NEW YORK.

ACCELERATOR FOR THE VULCANIZATION OF RUBBER.

No Drawing. Original application filed February 6, 1925, Serial No. 7,237. Divided and this application filed June 17, 1925. Serial No. 37,868.

*To all whom it may concern:*

Be it known that I, PAUL MELVIN PAULSON, a citizen of the United States, and resident of Perth Amboy, in the county of Middlesex and State of New Jersey, have invented certain new and useful Improvements in Accelerators for the Vulcanization of Rubber, of which the following is a specification.

The object of this invention is to provide accelerators for the vulcanization of rubber that are non-toxic, will not discolor white articles or bright colors, are convenient to handle and can be readily incorporated into the rubber mix in the mill room.

A further object of this invention is to produce a class of accelerators which will bring to the finished rubber articles, in which they are used, superior physical properties such as higher stress strain relationship, increased tensile strength, better aging qualities and freedom from sulphuring out or blooming.

Still another object is to provide high powered accelerators at lower costs than are now prevalent.

This application is a division of application S. N. 7,237 filed Feb. 6, 1925, which was inadvertently made a joint application. This application pertains to that part of said joint application not covered by copending application S. N. 37,876 filed June 17, 1925.

This invention relates to the use of those bodies formed by the interaction of cyanamide and salts of amines other than aniline as accelerators of vulcanization for natural rubber, balata, gutta percha, synthetic rubber and rubber substitutes. It especially relates to the acceleration of vulcanization of natural rubber at elevated temperatures. I am aware that the product obtained by treating with caustic the reaction product of aniline and cyanamide has heretofore been proposed as a rubber accelerator, and make no claim thereto herein.

I have discovered that those materials made by the addition of aromatic amines, or mixed aliphatic-aromatic amines such as methylaniline, to cyanamide form a new and useful class of accelerators which produce superior rubber with higher tensiles and better aging properties than are produced by other accelerators now in use. This new and useful class of accelerators includes, among others, those bodies formed by treating with caustic the products formed by the action of the salts of the following materials:—aniline, other than aniline hydrochloride, methyl aniline, ethyl aniline, the toluidines with their alkyl derivatives, xylidine with its alkyl derivatives, diphenylamine, and the naphthylamines upon cyanamide by which is to be understood the unpolymerized or free cyanamide ($CNNH_2$). I prefer to use the hydrochloride salts of the above amines.

All these compounds are characterized in that they correspond to the general formula

in which occurs the group

which is known as the guanidine group from the formula of guanidine, which is:

In the naming of these compounds the designation of the nitrogen atoms of guanidine on which the substituting groups occur is made following the usage as shown in the Decennial Index of Chemical Abstracts, 1907 to 1916, subject index page 3216 under guanidine. This designation is as follows:

applied to the formulæ as I have written them this designation becomes

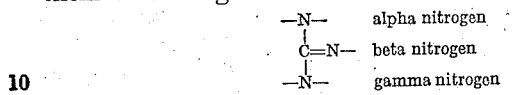

The compounds of my invention may also be given an amine name which designates their method of formation as disclosed herein. These amine names are hereafter given in parenthesis following the name more commonly employed.

Compounds containing this guanidine grouping have previously been used as accelerators of the vulcanization of rubber but in all of these compounds the substituting groups have always occurred on two or sometimes all three nitrogen atoms with the exception of alpha mono phenyl guanidine (guanyl aniline). Thus the common diphenyl guanidine of the art, which is strictly speaking, alpha-gamma-diphenyl guanidine, has the formula:

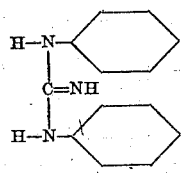

Likewise triphenyl guanidine has the formula:

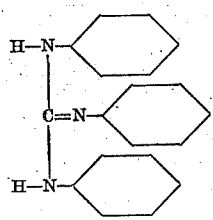

and is properly called alpha-beta-gamma-triphenyl guanidine or symmetrical triphenyl guanidine.

I have discovered however a new class of accelerators in which the substituting groups occur on but one nitrogen atom and in that sense they are mono-nitrogen substituted guanidines although both hydrogens of the nitrogen in question may be replaced by a substituting group. I, therefore, call these, in accordance with the reference as cited above, alpha-substituted guanidines and as such they may have one or two substituting groups on the alpha nitrogen atom. It is of course obvious that I might arbitrarily call these gamma-substituted since the alpha and gamma nitrogen are identical.

The accelerators of my invention then contain the characteristic group

and are represented by the general formula

I have prepared many individuals in this mono nitrogen substituted system. I have found that those materials prepared so that R of the general formula is an aromatic group form the preferable class for the use as accelerators of vulcanization, with this group the group R' may be any aromatic group or any aliphatic group, or R may be any substituted aromatic group of more than six carbon atoms when R' is hydrogen.

These products are prepared by selecting the proper amine and causing it to react with cyanamide. As an example of the general type

wherein R is a substituted aromatic radical of more than six carbon atoms, is herewith given mono orthotolyl guanidine, (guanyl ortho-toluidine) formed as follows from ortho toluidine hydrochloride and cyanamide.

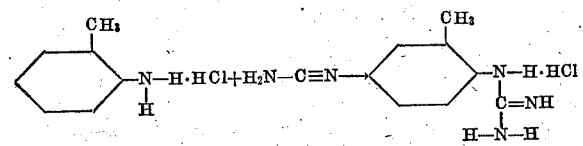

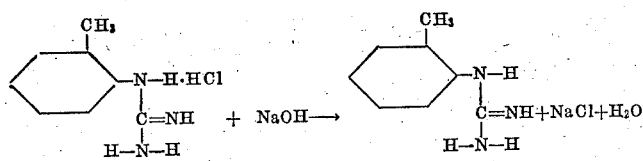

As an example of the general type

wherein R is an aromatic radical and R' is an aliphatic radical I have prepared alpha-alpha-methyl-phenyl guanidine (guanyl methyl aniline) formed as follows from mono methyl aniline hydrochloride and cyanamid:

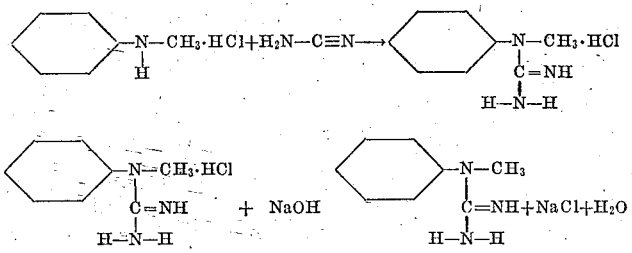

As an example of the general type

wherein both substituting groups are aromatic I have prepared alpha-alpha-diphenyl guanidine (guanyl diphenyl amine) from diphenyl amine hydrochloride and cyanamide as follows:

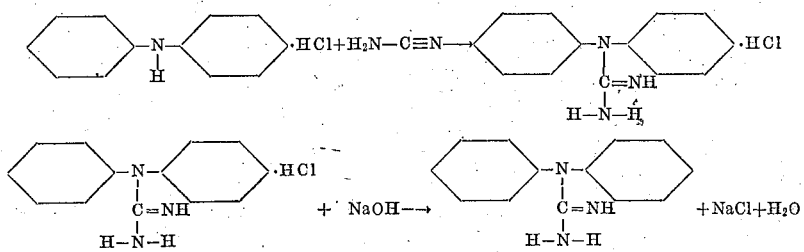

Most of these materials have low melting points, or are liquids and none of them decompose at the temperatures which are used in the vulcanization of rubber and for these reasons are much more easily compounded than other accelerators having higher melting points. This is a decided advantage for accelerators which are as rapid as those which we have discovered.

My preferred method of making these materials is as follows:—

To a solution of one mol of unpolymerized or free cyanamide in ethyl acetate, or other suitable solvent, is added an equivalent amount of a salt of the amine of the substituting group. The ethyl acetate is distilled off and the temperature raised to from 90 to 120° C., till the reaction is complete. The mixture is dissolved in water and the accelerator precipitated with caustic alkali.

I have used the term caustic or caustic alkali throughout the specification and specifically mentioned sodium hydroxide but I do not wish to be understood as having limited myself to this specific base. Any substance having an alkalinity sufficiently large, as for example, potassium hydroxide, to free the organic base from the acid could be used.

On account of the well known tendency of free cyanamide to polymerize or otherwise undergo changes, I prefer to use it in the form of a solution in ethyl acetate or of some other solvent which does not have a tendency to cause polymerization, hydrolysis, etc., of the free cyanamide.

Proceeding as above I have prepared alpha mono ortho tolyl guanidine (guanyl ortho toluidine) which is first precipitated as an oil and later crystallizes to leafy crystals having a melting point of about 46° C. The alpha mono-para tolyl guanidine (guanyl para toluidine) precipitates in white leafy crystals of a soft silky texture having a melting point of about 68° C. The mono xylyl guanidine (guanyl-4-metaxylidine) from 4-amino metaxylidine precipitates as a thick oil which crystallizes very slowly on standing. The product from diphenyl amine, alpha-alpha-diphenyl guanidine (guanyl diphenyl amine) consists of fine white crystals having a melting point of about 140° C. The alpha-alpha-phenyl-methyl guanidine (guanyl methyl aniline) separated as a reddish brown liquid and could not be crystallized. All of these have been employed to give good results in connection with the process included in the invention. I have also prepared and employed alpha-mono-phenyl guanidine (guanyl aniline), alpha-alpha-ethyl-phenyl guanidine (guanyl ethyl aniline), guanyl beta-naphthyl-amine and the product resulting from the reaction of benzidine with cyanamide.

Instead of precipitating the free bases or addition products of these materials with caustic soda, carbonates are readily formed which are also satisfactory accelerators, but in general have higher melting points and are likewise somewhat less active. These accelerators may be used in the usual manner to improve the quality of the finished rubber article, to reduce the length of time of cure, to lower the temperature required for vulcanization or to secure any combination of these advantages.

As a more specific example of the preparation of these bodies I shall now describe the preparation of the orthotoluidine reaction product with free cyanamide. To 330 grams of ethyl acetate solution of unpolymerized or free cyanamide containing 15.8% cyanamide by analysis was added 180 grams of orthotoluidine hydrochloride. This mixture was placed in a one liter flask heated by an oil bath. The mouth of the flask was connected to a condenser, a thermometer was inserted through the stopper and held in the reaction mixture. The oil bath temperature was raised slowly till the ethyl acetate was distilling freely and then held constant till most of the ethyl acetate had been distilled off. The temperature was then raised slowly till the reaction mixture was at 110–120° C. and this temperature maintained for 30 minutes. The hot reaction mixture was then taken up with 500 cc. water, poured into a 2 liter beaker and cooled to about 15° C. It was then filtered. The filtrate was well agitated by a mechanical stirrer and the beaker cooled by running tap water. 30% sodium hydroxide solution was slowly added causing a brown tinged oil to separate. The sodium hydroxide solution was added till no further separation of oil was seen on further addition of caustic solution. The agitation with cooling was continued; in about 5 minutes the separate oil globules crystallized. These small balls of crystals were then easily separated from the mother liquid by filtration. When dried they had a melting point of 45–47° C.

The methods of carrying out my invention with the accelerator thus produced and other similarly produced materials from other amines are illustrated by the following examples:

Example I—Friction stock.

Smoked sheet _____ 100
Zinc oxide _____ 5
Sulphur _____ 5
Mono ortho tolyl guanidine _____ 1

When this stock is cured for 40 minutes at 140° C., the following properties are obtained:—

| Stretch. | Permanent set. | Load at 600% elong. | Tensile. |
|---|---|---|---|
| 782 | 15 | 1686 | 4300 |

When this same stock is cured for 35 min. at 40 lbs. steam pressure and subjected to a temperature of 70° C. for one week, the following results were obtained:—

| Days aged | 0 | 1 | 7 |
|---|---|---|---|
| 600% elong | 1384 | 1843 | 1361 |
| Tensile | 3490 | 3646 | 3543 |

Example II.

Smoked sheet _____ 100.00
Zinc oxide _____ 100.00
Sulphur _____ 5.00
Mono ortho tolyl guanidine _____ .75

When this stock was cured for 40 min. at 40 lbs., the following results were obtained:—

| Stretch. | Permanent set. | Load at 500% elong. | Tensile. |
|---|---|---|---|
| 612 | 25 | 2325 | 3571 |

When this stock was cured 35 min. at 40 lbs. steam pressure and subjected to the aging test as above, the following results were obtained:—

| Days aged | 0 | 1 | 7 |
|---|---|---|---|
| 400% elong | 1301 | 1239 | 1025 |
| Tensile | 3170 | 3215 | 3810 |

Example III.

|  | Parts. |
|---|---|
| Smoked sheet | 100 |
| Zinc oxide | 5 |
| Sulphur | 5 |
| Alpha-alpha-diphenyl guanidine (guanyldiphenyl amine) | 1.25 |

When this stock was milled and cured for 15 minutes at 40 pounds steam pressure, the following results were obtained:

| Stretch. | Permanent set. | Load at 500% elong. | Tensile. |
|---|---|---|---|
| 712 | 20 | 1800 lbs. | 4093 lbs. |

Example IV.

Smoked sheet, zinc oxide and sulphur as in Example III, 1.25 parts alpha-alpha-phenyl methyl guanidine (guanyl methyl aniline).

Milled and cured for 30 minutes at 40 pounds steam pressure.

| Stretch. | Permanent set. | Load at 500% elong. | Tensile. |
|---|---|---|---|
| 651 | 15 | 1700 lbs. | 4813 lbs. |

Example V.

Smoked sheet, zinc oxide and sulphur as in Example III. 1.25 parts m-xylyl-4-guanidine (guanyl-4-meta xylidine).

Milled and cured for 45 minutes at 40 pounds steam pressure.

| Stretch. | Permanent set. | Load at 500% elong. | Tensile. |
|---|---|---|---|
| 730 | 20 | 2300 lbs. | 5040 lbs. |

Those experienced in the art will recognize that the accelerators illustrated above have manifested very excellent accelerating properties, and that the aging is very superior as shown not only by the tensile strength, but also by the fact that the stress strain relationship has remained fairly constant, showing that the stock does not harden with age.

I do not, however, wish to limit myself to the specific examples set forth above, as other proportions or other formulas may be used to obtain different results with my accelerators without departing from the spirit of my invention.

What I claim is:

1. A process of vulcanizing rubber or similar material which comprises combining with the rubber a vulcanizing agent and an accelerator represented by the general formula

wherein R is any organic group of more than six carbon atoms, and vulcanizing the rubber.

2. A process of vulcanizing rubber or similar material which comprises combining with the rubber a vulcanizing agent and an accelerator represented by the general formula

wherein R is any aromatic group of more than six carbon atoms, and vulcanizing the rubber.

3. A process of vulcanizing rubber or similar material which comprises combining with the rubber a vulcanizing agent and an accelerator represented by the general formula

wherein R and R' are dissimilar organic groups, and vulcanizing the rubber.

4. A process of vulcanizing rubber or similar material which comprises combining with the rubber a vulcanizing agent and an accelerator represented by the general formula

wherein R is an aromatic group and R' any other organic group, and vulcanizing the rubber.

5. A process of vulcanizing rubber or similar material which comprises combining with the rubber a vulcanizing agent and an accelerator represented by the general formula

wherein R is an aromatic group and R' an aliphatic group, and vulcanizing the rubber.

6. A process of vulcanizing rubber or similar material which comprises combining with the rubber a vulcanizing agent and an accelerator comprising a guanidine with an organic group of more than six carbon atoms substituted on the alpha nitrogen atom with hydrogen atoms on the gamma nitrogen atom, and vulcanizing the rubber.

7. A process of vulcanizing rubber or similar material which comprises combining with the rubber a vulcanizing agent and an accelerator comprising a guanidine with an aromatic group of more than six carbon atoms substituted on the alpha nitrogen atom with hydrogen atoms on the gamma nitrogen atom, and vulcanizing the rubber.

8. A process of vulcanizing rubber or similar material which comprises combining with the rubber a vulcanizing agent and an accelerator represented by the formula

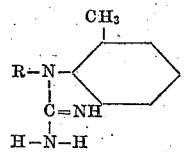

and vulcanizing the rubber.

9. A process of vulcanizing rubber or similar material which comprises combining with the rubber a vulcanizing agent and an accelerator represented by the formula

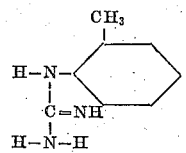

and vulcanizing the rubber.

10. A process of vulcanizing a rubber mixture which comprises combining the rubber mixture with a vulcanizing agent and mono ortho-tolyl guanidine and vulcanizing the mixture.

11. A process of vulcanizing rubber or similar material which comprises combining the rubber with sulphur, zinc oxide and mono ortho-tolyl guanidine and vulcanizing the rubber.

12. A vulcanized rubber derived from rubber or a similar material combined with a vulcanizing agent and an accelerator represented by the general formula

wherein R is any organic group of more than six carbon atoms.

13. A vulcanized rubber derived from rubber or a similar material combined with a vulcanizing agent and an accelerator represented by the general formula

wherein R is any aromatic group of more than six carbon atoms.

14. A vulcanized rubber derived from rubber or a similar material combined with a vulcanizing agent and an accelerator represented by the general formula

wherein R and R′ are dissimilar organic groups.

15. A vulcanized rubber derived from rubber or a similar material combined with a vulcanizing agent and an accelerator represented by the general formula

wherein R is an aromatic group and R′ any other organic group.

16. A vulcanized rubber derived from rubber or a similar material combined with a vulcanizing agent and an accelerator represented by the general formula

wherein R is an aromatic group and R′ an aliphatic group, and vulcanizing the rubber.

17. A vulcanized rubber derived from rubber or a similar material combined with a vulcanizing agent and an accelerator comprising a guanidine with an organic group of more than six carbon atoms substituted on the alpha nitrogen atom with hydrogen atoms on the gamma nitrogen atom.

18. A vulcanized rubber derived from rubber or a similar material combined with a vulcanizing agent and an accelerator comprising a guanidine with an aromatic group of more than six carbon atoms substituted on the alpha nitrogen atom with hydrogen atoms on the gamma nitrogen atom.

19. A vulcanized rubber derived from rubber or a similar material combined with a vulcanizing agent and an accelerator represented by the formula

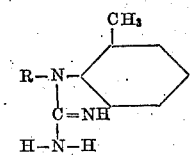

20. A vulcanized rubber derived from rubber or a similar material combined with a vulcanizing agent and an accelerator represented by the formula

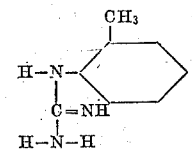

21. A vulcanized rubber derived from rubber or a similar material combined with a vulcanizing agent and mono ortho-tolyl guanidine.

22. A vulcanized rubber derived from rubber or a similar material combined with sulphur, zinc oxide and mono ortho-tolyl guanidine.

23. A process of vulcanizing rubber or similar material which comprises combining with the rubber a vulcanizing agent and an accelerator comprising the product formed by treating with caustic the reaction product of cyanamid with a salt of a substituted aromatic amine, and vulcanizing the rubber.

24. A process of vulcanizing rubber or similar material which comprises combining with the rubber a vulcanizing agent and an accelerator comprising the product formed by treating with caustic the reaction product of cyanamid with a salt of ortho toluidine, and vulcanizing the rubber.

25. A vulcanized rubber derived from rubber or similar material combined with a vulcanizing agent and an accelerator comprising the product formed by treating with caustic the reaction product of cyanamide with a salt of a substituted aromatic amine.

26. A vulcanized rubber derived from rubber or similar material combined with a vulcanizing agent and an accelerator comprising the product formed by treating with caustic the reaction product of cyanamide with a salt of ortho toluidine.

Signed at Perth Amboy, in the county of Middlesex and State of New Jersey, this first day of June, A. D. 1925.

PAUL MELVIN PAULSON.